May 22, 1956 M. N. FAIRBANK ET AL 2,747,103
RADIATION DETECTION DEVICES
Filed March 28, 1951 3 Sheets-Sheet 3
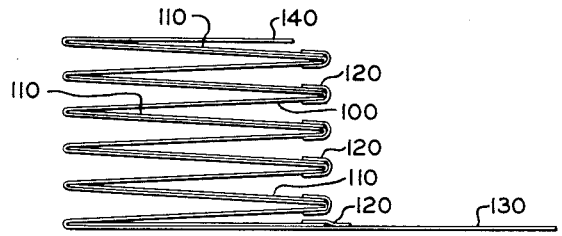
FIG. 10
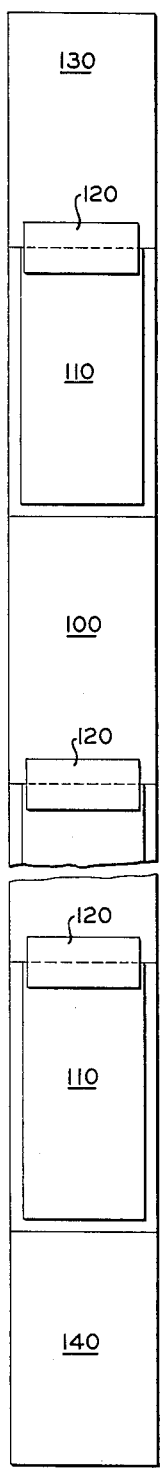
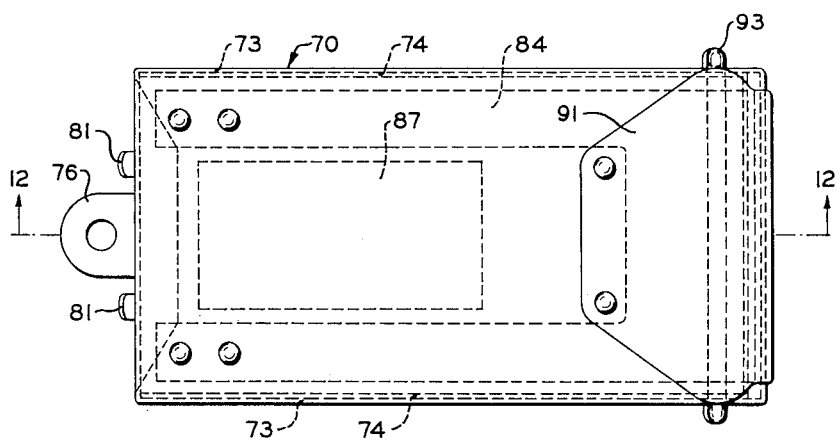
FIG. 11
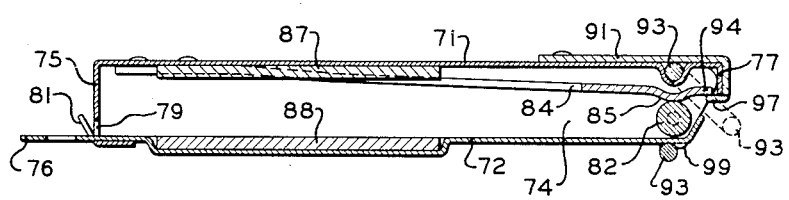
FIG. 12
FIG. 9
Murry N. Fairbank
and
William A. Shurcliff
INVENTORS
BY Brown and Mikulka
and
Moncure B. Berg
ATTORNEYS

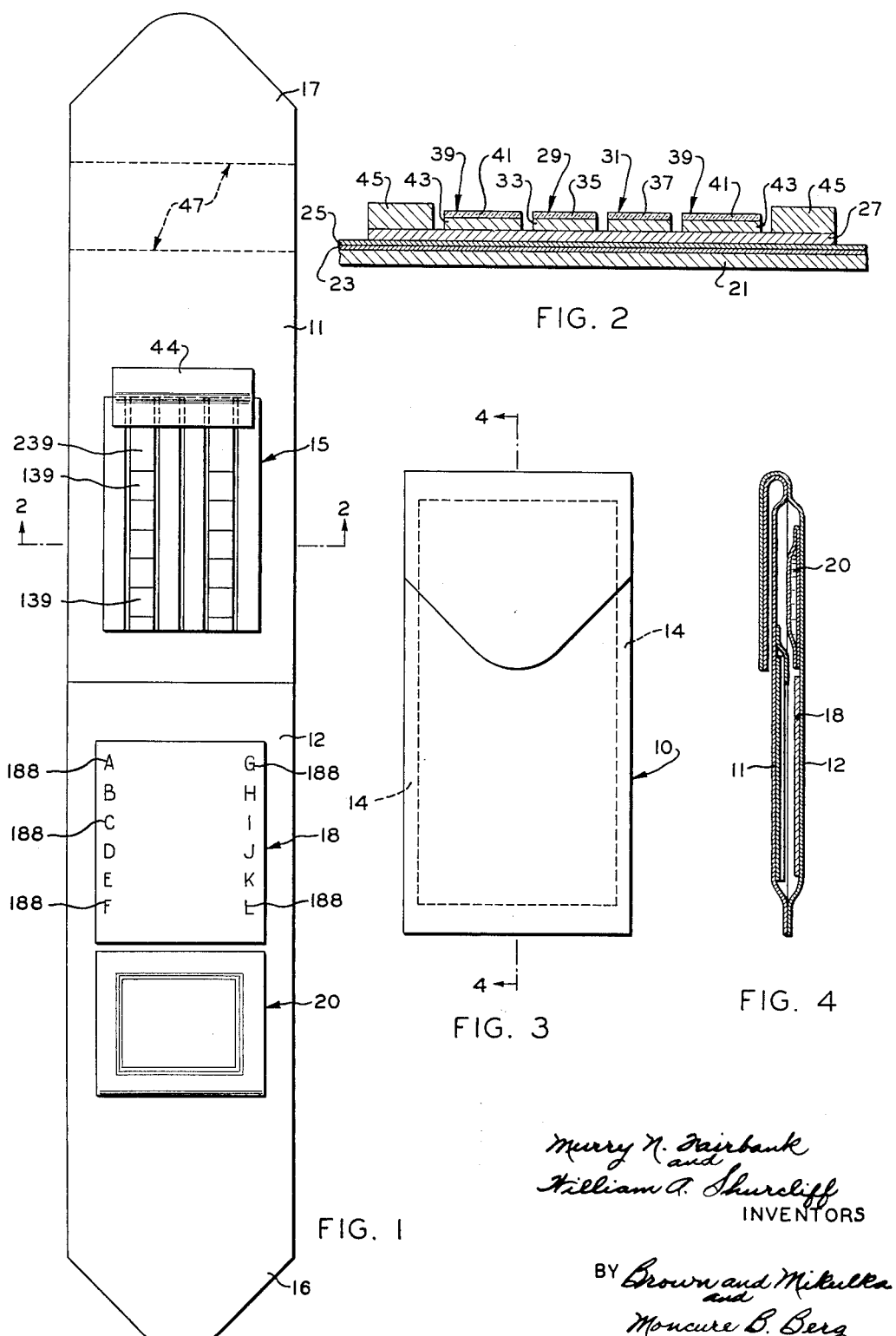

United States Patent Office 2,747,103
Patented May 22, 1956

2,747,103

RADIATION DETECTION DEVICES

Murry N. Fairbank, Belmont, and William A. Shurcliff, Cambridge, Mass., assignors to Polaroid Corporation, Cambridge, Mass., a corporation of Delaware Application March 28, 1951, Serial No. 218,042

12 Claims. (Cl. 250—68)

This invention relates to products, in the nature of dosimeters, which are sensitive to nuclear radiation and especially to products of this character utilizing photosensitive materials for detecting, indicating, recording and measuring such radiation.

An object of the invention is to provide a dosimeter employing an envelope wherein the wall members thereof are releasably sealed together and are formed of material substantially impervious to light waves, liquids and vapor, while being capable of transmitting nuclear radiation to be detected, and wherein the envelope contains photosensitive materials of a character selectively sensitive to nuclear radiation, together with photographic reagents, releasable upon application of pressure to said envelope, for processing said photosensitive materials to form a transfer print therefrom on a print-carrying element located within the envelope, and also wherein said envelope includes means for indicating the extent of exposure of the dosimeter to the nuclear radiation to be detected.

Other objects of the invention are to provide a dosimeter of the character described wherein the means for indicating the extent of exposure of the dosimeter to nuclear radiation is a reference strip which, at least upon contact with photographic processing reagents within the envelope, is capable of providing a scale of gray tones adapted to be compared with a transfer print of a photosensitive recording strip to determine the extent to which the recording strip has been subjected to nuclear radiation and may comprise a preexposed and undeveloped photosensitive strip photographically printed through a record of a scale of gray tones or a strip of substantially insensitive material bearing or being provided with a preformed scale of gray tones; to provide in a dosimeter of the character described an unexposed photosensitive portion capable of indicating possible failure of the unit; to provide in a product of the nature with which this invention is concerned a photosensitive element comprising at least one photosensitive recording strip and preferably comprising two or more photosensitive recording strips of silver halide wherein each recording strip has a different film speed with respect to nuclear radiation to be detected.

Other objects of the invention will in part be obvious and will in part appear hereinafter.

The invention accordingly comprises the products possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 is a plan view of a dosimeter with the envelope wall portions thereof spread apart;

Fig. 2 is a sectional view on the line 2—2 of Fig. 1 and shows the detailed construction of an envelope wall member and a photosensitive element carried thereby;

Fig. 3 is a plan view of a sealed dosimeter in storage condition with the leader or tab portions thereof folded over upon an outer surface of the envelope;

Fig. 4 is a sectional elevation on the line 4—4 of Fig. 3;

Fig. 9 is a diagrammatic plan view of a fanfold type of dosimeter unit in unfolded condition;

Fig. 10 is a diagrammatic elevation showing the fanfold unit of Fig. 9 in folded condition;

Fig. 11 is a plan view of a device or apparatus for processing, shielding and storing dosimeters of the character forming the subject of this invention; and Fig. 12 is a sectional elevation taken on the line 12—12 of Fig. 11.

Figure 5:
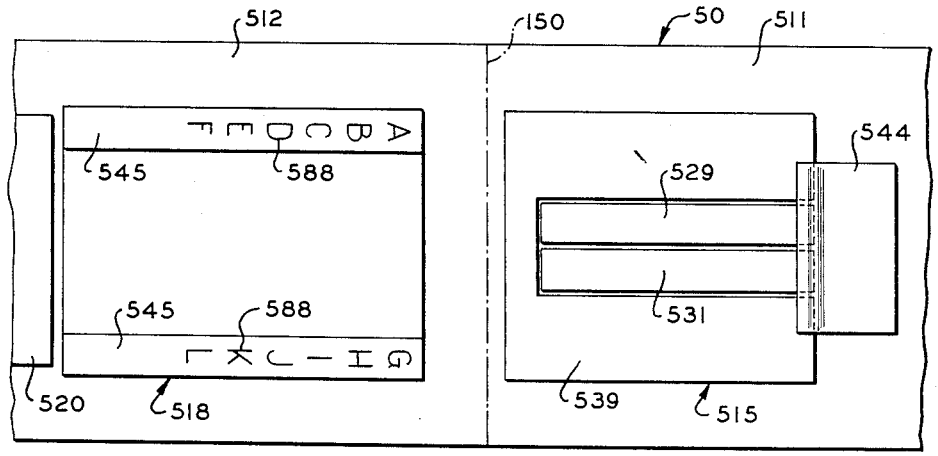
Fig. 5 is another embodiment of a dosimeter envelope with the wall portions thereof positioned in spread-apart condition.

By the present invention, means are provided for detecting the presence of nuclear radiation and for indicating or recording and for measuring the dosage of radiation to which these means have been subjected. "Nuclear radiation" as employed herein includes electromagnetic radiation having a wavelength shorter than the wavelength of radiation within the ultraviolet region of the spectrum, for example X-rays and gamma rays, and also includes corpuscular radiation, for example alpha particles, beta particles, fission product particles and the like. As it is well known, all types of nuclear radiation are, at least to some extent, harmful to the human body. X-rays and gamma rays are, in general, the most dangerous types of nuclear radiation. Consequently, a detection device should be designed so as to detect these most harmful types of radiation. The present invention is particularly concerned with the detection of radiation lying within a wavelength range of from 0.2 A to 0.002 A, it being pointed out that X-rays and gamma rays are both included within this range.

Radiation detection devices, now commonly called dosimeters, are useful to laboratory workers and the like as means for indicating whether working conditions are unsafe due to the presence of nuclear radiation in harmful quantities and arising, for example, from devices which generate X-rays or in the handling, for one purpose or another, of radioactive materials. Dosimeters are also useful for indicating localities which have become contaminated by nuclear radiation as a result, for example, of an atomic explosion. Dosimeters, such as those of the present invention which are able to record the radiation dosage to which a person has been subjected, possess further utility in that they will supply needed information for appropriate medical treatment.

Photosensitive materials, in addition to being sensitive to light, are also, as a general rule, sensitive to or exposable by nuclear radiation. A photosensitive heavy metal salt, capable upon photoexposure of having formed therein latent image which is developable to the metal of the salt to provide a visible image, is an example of such a photosensitive material. Preferred materials employed in the practice of the invention are the photosensitive silver halides which are commercially available in a wide variety of photographic emulsions. Recognizing this property of photosensitive materials, the present invention utilizes such materials to provide the novel dosimeter set forth herein.

As it is now well understood to the art, a photographic transfer process may be carried out to provide, in a print-carrying element, a reverse image of a latent image contained in a layer of a photosensitive material. In the case of a photosensitive element having a photosensitive silver halide layer which contains latent image, processing of this character includes permeating a photographic developer and a silver halide solvent into the photosensitive element, including the silver halide layer, and bringing the photosensitive element and the print-receiving element into face-to-face contact. The result of this procedure is to develop latent image to silver and to form in the photosensitive element a soluble silver complex from unexposed silver halide for transfer to the print-carrying element. This complex, at least in part, is transferred by imbibition to the print-carrying element where it is developed to silver to provide the desired reverse image.

The photosensitive units or dosimeters illustrated herein all make use of the principles of a transfer process in indicating or recording the detection of nuclear radiation. These principles are specifically set forth in United States Patent No. 2,543,181, issued February 27, 1951 to Edwin H. Land for Photographic Product Comprising a Rupturable Container Carrying a Photographic Processing Liquid. This patent also includes a detailed description of film units comprising a photosensitive element and a print-carrying element and adapted to contain all of the photographic materials needed to process the unit, and further includes a description of liquid processing compositions usable with such units. The practices, photographic materials and compositions therein described are generally suitable for carrying out the present invention and special reference for the details thereof are made to the just-mentioned patent.

In all embodiments of the invention herein set forth, the dosimeter or photosensitive units disclosed comprise an envelope having a pair of overlying wall members which are releasably secured together. With reference to Figs. 1 through 4, such an envelope is indicated generally by the reference numeral 10. The overlying wall members of envelope 10 are similar in outline and may comprise individual elongated layers 11 and 12 which are generally rectangular in shape. As illustrated in Fig. 4, layers 11 and 12 are positioned in superposed relation so as to form the outer layers of the envelope 10. Layers 11 and 12 are releasably secured together by means of a strippable adhesive bond along the longitudinal edges thereof and also transversely of the layers at one end thereof. This adhesive bond between the overlying envelope layers also extends transversely thereof at a position which is preferably, although not necessarily, somewhat removed from the second end of the layers. This bond is adapted to provide a seal between the layers which is impervious to liquid and to light of a wavelength actinic to photosensitive materials within envelope 10 and is shown in Fig. 3 at 14 as extending over an area lying between the rectangular marginal outline of the envelope as therein illustrated and the dotted line parallel to said outline.

By this arrangement it will be apparent that each layer 11 and 12 providing an envelope wall member will have a portion thereof at one end which is unconnected to the other layer. These portions 16 and 17 (Fig. 1) in the form of extensions are in effect leaders which provide means to facilitate handling of the photosensitive unit, as well as means to assist in stripping the layers so that they may be placed in the spread-apart condition of Fig. 1.

Alternatively, the wall members for the envelope 10 may be a part of a single elongated strip which is folded transversely of itself, as for example on the fold line 150 shown in Fig. 5.

Each of the layers 11 and 12 of the envelope is formed of a material which is substantially impervious to processing liquid employed within the unit and which is also substantially impervious to the atmosphere. These layers 11 and 12 are further characterized by the fact that they are each substantially opaque to light of a wavelength to which photosensitive material within the envelope is actinic and that they transmit shorter wavelength radiation including X-rays and gamma rays.

The envelope 10 is adapted to contain a photosensitive element and a print-carrying element generally and respectively designated by the reference characters 15 and 18 and a rupturable container 20 adapted to hold a photographic liquid processing composition. The photosensitive element 15 and the print-carrying element 18 are each carried by the inner surface of a different one of the layers 11 and 12. For example, the photosensitive element 15 is shown associated with the layer 11 and the print-carrying element 18 is shown associated with the layer 12. The container 20, which is adapted to hold a liquid processing composition, may be carried by either of the layers 11 or 12 but is generally and preferably associated with the layer having the print-receiving element 18 mounted thereon. Container 20 is provided with a releasably sealed liquid-dispensing mouth located to extend transversely of the layer 12 at a position adjacent one end of the print-carrying element 18.

The photosensitive element 15, the print-carrying element 18, and a container 20 are so positioned on their respective layers 11 and 12 that when the layers are superposed, the photosensitive element and the print-carrying element will be located in superposed registered relation with the container positioned to discharge its liquid content between the layers so that it may be spread over the opposing faces thereof. Container 20 is so constructed that, upon the application of suitable pressure to opposite sides of the envelope 10, it may be ruptured to discharge its contents through the dispensing mouth thereof.

The wall members or outer layers 11 and 12 of the envelope are substantially impervious to a liquid processing composition employed with the dosimeter unit and to this end are constructed to comprise a base 21 formed of kraft paper to which a layer 23 of aluminum or lead foil is adhered and over which a coating 25 of a thermoplastic material is applied. The coating 25 may comprise a polyvinyl acetal, for example polyvinyl butyral, polyvinyl acetal or polyvinyl formal, and is in effect a pressure-and/or heat-sensitive adhesive. The construction of the outer layers of the envelope for all embodiments of the invention is shown in detail in Fig. 2.

Use of a plastic coating over the layer 23 of aluminum or lead foil is useful from a number of standpoints. The coating is selected to be inert to the processing liquid and also as a means for releasably securing together the layers 11 and 12 over the area 14 of Fig. 3. Furthermore, the adhesive properties of the coating 25 permit the container 20 to be adhered thereto. For example, the container may be heat-sealed to the layer 12 along the edge of the container which is closest to the leader 16. Also, if desired, the adhesive properties of the coating 25 may be utilized, as in the dosimeter structure of Fig. 6, for securing the photosensitive element and the print-carrying element thereof to the inner surfaces of the envelope wall members. To substantially prevent the access of actinic light at the sealed portions of the envelope wall members, it is desirable to include a suitable light-opaque dye or pigment such as carbon black in the plastic material forming the coating 25.

All of the detection devices disclosed herein have certain common characteristics. For example, each embodiment of the invention makes use of at least one photosensitive recording strip and at least one reference strip which may or may not be of a photosensitive nature. Each reference strip provides means for indicating the extent of exposure of the dosimeter to nuclear radiation and is characterized by the fact that, at least upon contact with the photographic processing reagents within the envelope, it is capable of providing a scale of gray tones adapted to be compared with a transfer print of a recording strip to determine the extent to which the strip has been subjected to nuclear radiation. In all embodiments of the invention the photosensitive recording strips and the reference strips are generally rectangular in shape, although of course the invention may be carried out with other geometrical outlines for these recording and reference members. Preferably, from the standpoint of increasing the indicator and recording range of the dosimeters, it is desirable to employ two or more photosensitive recording strips which are formed of photosensitive materials having different film speeds for nuclear radiation. With such an arrangement, it is desirable to associate a reference strip with each photosensitive recording strip.

Another common characteristic of the various dosimeter embodiments resides in the provision of a strip or portion of unexposed photosensitive material which is sensitive to light and heat but which is relatively insensitive to nuclear radiation in doses of a magnitude equal to the greatest dosage likely to be encountered or to the maximum dosage adapted to be indicated or measured by the dosimeter, e. g., to dosages of about 500 roentgens. Such a strip or portion of unexposed photosensitive material is useful to show, by the density of its transfer record, the successful operation or the failure of the dosimeter and in this regard affords a guarantee. Attention is here called to the fact that the photosensitive materials employed for the recording strips are so much more sensitive to nuclear radiation than the photosensitive material used with the guarantee strip or portion that exposure of the former may be effected without exposure of the guarantee strip or portion.

With regard to failure of the dosimeter, it is pointed out that such may arise from a variety of causes. Among these may be mentioned the leakage into the envelope of actinic light whereby to prematurely expose the photosensitive materials therein or the fogging of such photosensitive materials by the subjection of the dosimeter to high temperatures, or for other reasons, such as the failure of the processing liquid, as for example from oxidation of the developer or by mechanical failure due to the improper processing of the dosimeter.

In the embodiment of the invention shown in Figs. 1 and 2, the photosensitive element 15 is illustrated as comprising a support 27 to which two photosensitive recording strips 29 and 31 are secured, as by means of a suitable adhesive. Each photosensitive recording strip 29 and 31 comprises a conventional film base 33 on which is supported a silver halide emulsion. The emulsion or layer 35 of photosensitive material associated with the recording strip 29 has a faster film speed with regard to the radiation to be detected than has the emulsion 37 associated with the recording strip 31. The photosensitive element 15 also includes two photosensitive reference strips 39, each of which comprises a conventional film base 43 on which is supported a silver halide emulsion layer 41. The photosensitive material of each reference strip 39 has a similar film speed for nuclear radiation and is so insensitive or slow to nuclear radiation as to remain substantially unaffected by the radiation dosages expected to be encountered.

Each of the photosensitive strips 29, 31 and 39 extends longitudinally of the support 27 and is spaced transversely thereof and in symmetrical relation. Preferably, the recording strips 29 and 31 will be located centrally of the photosensitive element with the reference strips 39 positioned towards the outer edges of the element 15. Rectangularly shaped spacer strips 45 of paper, cardboard, plastic sheeting, or the like, extend longitudinally of the photosensitive element 15 adjacent each long edge thereof in spaced relation to the photosensitive strips 39 and are utilized for a purpose which will hereinafter become apparent.

By construction, the photosensitive element 15 is only slightly longer than the print-carrying element 18. It is therefore preferable to secure the photosensitive element 15 to the layer 11 by a strip 44 of pressure- and/or heat-sensitive adhesive, rather than by heat-sealing the photosensitive element to the layer 11, whereby to prevent possible fogging of the photosensitive materials which form the element 15. This adhesive strip 44 is engaged by the element 15 across one end thereof and is also engaged by the wall-forming member or layer 11.

With specific regard to the reference strips 39, it is to be noted that they have been subjected to preexposure and therefore contain latent image. This preexposure is made through a scale of gray tones in steps of increasing optical density which extend lengthwise of each reference strip from at least adjacent one end thereof towards the other end of the strip. In Fig. 1, the latent image gray scale steps on each reference strip 39 are diagrammatically indicated as lying within the areas denoted by the reference character 139. Each latent image gray scale step is formed by an exposure which will produce a transfer print on the print-receiving element 18 having an optical density substantially equivalent to the transfer print produced by exposure of a recording strip 29 or 31 to nuclear radiation of predetermined intensity.

Each reference strip 39 is shown as having six gray scale steps 139 of latent image. A greater or lesser number of gray scale steps may be employed. The steps 139 may be formed to provide transfer prints on the print-carrying element 18 in the form of steps which vary in optical density from white or near white to black or near black. Each reference strip 39 may be exposed so as to form a similar set of gray scale latent images therein. It is, however, within the scope of the invention to differently expose each reference strip 39 so as to provide dissimilar sets of gray scale latent images. For example, the left and right reference strips may be exposed so that together they produce gray scale means which together provide 12 steps covering a density range of from white or near white to black or near black.

For practical purposes, however, it has been found satisfactory to give similar exposures to all reference strips 39 so that each strip will produce a transfer print of a similar gray scale having six steps which vary in reflection density over a range of from about 0.2D to about 1.5D. In Fig. 1 the latent image of step 139 having the least exposure is located at the bottom end of the photosensitive element 15 while the gray scale step of greatest exposure is located towards the top of the photosensitive element.

Mention has been made of a guarantee strip or portion on the photosensitive element. In the event that the bottom gray scale step 139, as viewed in Fig. 1, is substantially unexposed, this may serve as a guarantee portion. Alternatively, if the gray scale is printed only over a part of a reference strip 39, the unexposed portion of the reference strip may be used as the guarantee portion. Such a portion is indicated at 239 on each of the reference strips disclosed in Fig. 1.

The print-carrying element 18 may comprise a suitable permeable material such, for example, as paper or the like, and is adapted to be secured to the inner surface of the wall-forming member or layer 12 as by heat-sealing to the plastic coating 25 on the layer, or by means of an adhesive strip positioned transversely of the element and engaged with an end thereof and with a part of the layer 12, or it may be secured by other appropriate means.

As may be noted, indicia, such as the letters A, B, C, and so on to L, extend along each side of the print-carrying element 18. These characters may be formed by conventional mechanical printing or other practices directly onto the surface of the print-carrying element 18 or they may be printed or otherwise formed on separate strips which are secured to the element 18. As shown in Fig. 1, there are a series of six characters 188 on each side of the print-carrying element 18. Thus, each character is referred to a gray scale step 139 on the photosensitive element 15 and is adapted to provide an indication of the intensity of the radiation represented by the transfer print of that particular gray scale step 139. Each letter of the indicia 188 represents intensity of radiation in roentgens. Instead of this practice, the intensity in roentgens may be substituted for the letters. In any event, the indicia 188, together with the transfer print of each gray scale, are adapted to provide a measuring reference with which the transfer print of each recording strip formed upon processing the dosimeter may be compared.

The container 20 is formed of a sheet material such as that employed in providing the wall members 11 and 12 of the envelope and comprises a base of kraft paper, such as the layer 21, a layer of aluminum or lead foil, such as the layer 23, and a coating of a thermoplastic material, such as the coating 25. Rupturable containers of this character may be formed from a rectangularly shaped blank which is folded over upon itself and is heat-sealed around its periphery, the container being filled with the processing liquid prior to completion of the heat-sealing. Preferably, the container 20 is provided with a weaker seal along its dispensing mouth portion than along other sealed portions of the container. One convenient manner of providing a weaker seal is to coat a narrow area on one surface of the container blank adjacent the mouth-forming edge thereof with a thermoplastic material which has a lesser affinity for a thermoplastic material like that of coating 25 than said coating has for itself. As one example of a thermoplastic material of this character, mention is made of ethyl cellulose. Details of containers of the general character suitable for use with this invention are disclosed in the copending application of Edwin H. Land, Serial No. 652,612, filed March 7, 1946, for Fluid Containers now Patent No. 2,634,886 issued April 14, 1953.

The just-described practice for obtaining a weaker seal is also useful in connection with the wall members 11 and 12 whereby to assist in facilitating and assuring their separation following a processing operation. Thus, for example, the wall member 11 may be striped with a material such as ethyl cellulose over a portion 47 thereof located adjacent the leader 17. This expedient provides a bond adjacent the leaders 16 and 17 which will be weaker than the bond along the periphery of the sealed unit.

Print-carrying element 18 preferably comprises a support on which is coated a liquid-permeable material, preferably gelatin. Examples of print-carrying elements which are especially suitable for this purpose comprise photographic materials known to the art as imbibition paper and baryta paper. Other materials include water-permeable plastics such as regenerated cellulose, polyvinyl alcohol and the like. Detailed descriptions of suitable materials for the print-carrying element are disclosed in the aforementioned United States Patent No. 2,543,181.

As already noted, the silver halide emulsions 35, 37 and 41 are differently sensitive to nuclear radiation and consequently have different film speeds with respect to such radiation. The least sensitive emulsion is the emulsion 41 employed in the formation of the reference strips 39. A photosensitive material is selected for the slow emulsion 41 which is relatively insensitive to X-rays and gamma rays whereby latent image resulting from exposure to nuclear radiation will not be formed unless the radiation is in a quantity of around 1000 roentgens, which exceeds the maximum expected dose. Silver halide printing papers, especially the so-called contact papers, are suitable for this purpose. A contrasty silver halide contact printing paper of this character is commercially available under the name of "Velox F–4."

In the embodiment shown in Fig. 2, the emulsion 29 has the fastest film speed for nuclear radiation. The layer 35 employs photosensitive material in which latent image will be formed when the material is subjected to from about 5 to 10 roentgens and which will become completely exposed when subjected to about 50 roentgens. Conventional silver halide copying papers of high contrast and high speed with respect to light waves, and especially papers employed in projection photocopying, are suitable for this purpose. A copying paper of this character is commercially available under the name of "Kodagraph Projection Ledger."

The photosensitive material providing the layer 31 is of intermediate speed as compared to the photosensitive material of layers 41 and 35. The layer 31 employs a photosensitive material in which latent image will be formed when the material is subjected to about 75 roentgens and which will be completely exposed when subjected to about 500 roentgens. For this purpose, a conventional high speed silver halide enlarging paper is useful. A specific example is enlarging paper commercially available under the name of "Royal Bromide F–4."

In using the emulsions just described, it will be apparent that the dosimeter has a range of from 5 to 10 roentgens to about 500 roentgens. The latter dosage is often fatal, as it is commonly known.

The liquid processing composition employed in container 20 for use with silver halide photosensitive material comprises an aqueous alkaline solution of a photographic developer and a silver halide solvent to which a thickening agent, such as sodium carboxymethyl cellulose, has been added. Detailed examples of suitable processing compositions are contained in the aforementioned United States Patent No. 2,543,181.

In processing the sealed dosimeter 10, the leader portions 16 and 17 are inserted between suitable pressure-applying members, which will be described in more detail hereinafter, and the unit as a whole is moved therebetween by manually grasping the leaders and pulling the dosimeter entirely through the pressure-applying members which are held in relatively fixed position. As a result, the container 20 is ruptured and the liquid content thereof is discharged and spread between the overlying faces of the emulsion layers 35, 37 and 41 and the face of the print-carrying element 18.

The spacer strips 45 on the photosensitive element 15 are adapted to contact the print-carrying element 18 adjacent the sides thereof and to cover the indicia 188 when the layers 11 and 12 of the envelope are pressed together during processing and assist in controlling the spreading of the processing composition and in confining the liquid thereof to an area of the print-carrying element lying within the confines of the spacers. While spacer strips are, in general, desirable for the purposes just outlined, it is possible to obtain excellent processing without their use and their omission from the dosimeter units disclosed herein is deemed within the scope of the invention.

With further reference to Fig. 4, it is to be noted that the ends of the photosensitive and the print-carrying elements which are furthest removed from the container are spaced from the sealed ends of the wall members 11 and 12 to which they are next adjacent. The space between the ends of the photosensitive and print-carrying elements provided by this expedient serves for receiving liquid processing composition in excess of that spread over the superposed faces of the print-carrying and photosensitive elements. Alternatively, a special trap member or members between which or within which this excess liquid is collected may be provided within the dosimeter envelope and may be mounted on the inner surface of one of the wall members of the envelope adjacent the end of the photosensitive or the print-carrying element, or trap means may be provided by a special construction for the photosensitive and print-carrying elements, for example the construction illustrated in the dosimeter of Fig. 6.

After rupture of the container and spreading of its contents, the dosimeter is kept in sealed condition for about a minute to complete transfer processing. The wall members 11 and 12 are then stripped or separated from each other by grasping a leader portion 16 and 17 by each hand and peeling the dosimeter apart.

As a result of processing, a transfer print of the latent image gray scale on each reference strip 39 is formed on the print-carrying element 18 adjacent each set of indicia 188. In accordance with transfer principles, the print of the most exposed gray scale step on a photosensitive strip 39 will have the least density of the gray scale steps formed on the print-carrying element. This is because each gray scale step which is printed by transfer on the print-carrying element is a reverse image of the corresponding gray scale step photographically printed on the photosensitive element 15.

Thus, the least exposed area on each reference strip 39 will have the densest transfer print, while the most exposed area on each reference strip 39 will have the least dense transfer print. Consequently, the step A of the indicia A to F will appear as the darkest or most dense step for that set of indicia, while the step F will appear as the step of least density. A similar situation exists in connection with the steps G and L of the indicia set G to L. Under these circumstances, the measure of radiation dosage increases with decrease in density of the transfer prints of the gray scale steps. Hence, steps A and G will show the least dosage for their respective indicia sets, while steps F and L will show the greatest dosage.

Processing of the unit will provide prints of the recording strips 29 and 31 centrally of the print-carrying element 18 and extending from end to end thereof. The density of these prints is matched against a gray scale step opposite a set of indicia A to F and G to L. Assuming that neither of the photosensitive recording strips 29 and 31 have been exposed by nuclear radiation, the transfer prints formed of each recording strip will have a high density which is equivalent to the high density of step A and of step G of the respective scales.

On the other hand, if either of the photosensitive recording strips 29 and 31 has been subjected to nuclear radiation, the density of the transfer print formed thereby will be found to match some gray scale step other than the step A or G. Inasmuch as the user of the device will know what each gray scale step represents in terms of radiation dosage, he is able to determine the dosage to which he has been subjected by comparing the transfer print of a recording strip with the appropriate indicium 188.

It is important to keep in mind that the photosensitive recording strips 29 and 31 have different film speeds. Thus, it is possible to completely expose the strip 29 of faster film speed without exposing the recording strip 31. In this event, the transfer print of the recording strip 29 will have a low density at least equal to the least dense step on the gray scale opposite the indicia A to F, while the transfer print of the recording strip 31 will have a high density equal to or greater than the density of the step G of the indicia G to L. On the other hand, if the radiation is of an intensity sufficient to expose the recording strip 31, it is to be observed that the recording strip 29 will also be completely exposed.

A transfer print of guarantee portion 239 of each reference strip 39 should record the highest density when the dosimeter has satisfactorily operated. Information is at once conveyed that the dosimeter has failed for one of the previously mentioned reasons or for other causes if this tranfer print is less than the high density just described. Under the latter circumstances, any reading obtained by the dosimeter is valueless.

Various modifications in construction of the dosimeter unit fall within the scope of the invention. For example, in Fig. 5 a dosimeter unit 50 is disclosed wherein the overlying wall members of the envelope are each a part of a continuous strip of appropriate sheet material which is adapted to be folded along its transverse axis at the diagrammatically indicated fold line 150 whereby to form layers 511 and 512 which are adapted to overlie each other and to be sealed together in the manner described in connection with layers 11 and 12 of the dosimeter 10. The sheet material which provides the envelope wall-forming members for the dosimeter 50 is substantially similar to the material used for the layers 11 and 12. Also, the free ends of wall-forming layers 511 and 512 are provided with suitable leader portions (not shown).

Other structural variations are illustrated in Fig. 5. In this regard, the image-carrying element 518, and not the photosensitive element as in Fig. 1, has spacer strips 545 mounted adjacent the longitudinal edges thereof. This construction permits indicia 588 such as the indicia sets A to F and G to L to be printed on the upper surface of each spacer strip. Alternatively, a single piece of sheet material may be employed for the print-carrying element. In this instance, the gray scale indicia will be printed in ink along the edges of the print-carrying element, and spacer strips of transparent material, which are mounted over the printed indicia, will be employed. Otherwise, the print-carrying element 518 is substantially similar to the print-carrying element 18 heretofore described and, like the element 18, is secured to the inner surface of the layer 512 by heat-sealing.

By way of further modification, the dosimeter 50 makes use of a photosensitive element 515 which comprises a U-shaped member 539 of photosensitive reference material and photosensitive recording strips 529 and 531 which are located between the arms of the U-shaped member. The U-shaped member 539 and the photosensitive recording strips 529 and 531 each comprise conventional film base material which carries a photosensitive material of the character heretofore described. In this regard, the photosensitive materials for the U-shaped member 539 and the recording strips 529 and 531 correspond respectively to the photosensitive materials detailed in connection with the strips 29, 31 and 39. A suitable strip 544 of adhesive tape or other material is engaged with the inner surface of the wall-forming layer 511 and with the U-shaped reference member 539 adjacent the ends of the arms thereof and with each recording strip 529 and 531 for securing the photosensitive element to the layer 511. The photosensitive element 515 is positioned on the wall-forming layer 511 for registration with print-carrying element 518 when the layers 511 and 512 are folded over upon themselves. Under the conditions described, the base of the U-shaped member will be aligned with an end of the print-carrying element 518 when the unit is in spread-out condition as shown in Fig. 5.

A container 520, similar to the container 20, is adapted to be mounted at the end of the print-carrying element which is most distant from the photosensitive element when the envelope wall-forming members are in spread-apart condition. Except for the above-noted differences, the dosimeter 50 is like the dosimeter in Figs. 1 through 4.

It is to be understood that the photosensitive reference member 539 is adapted to have an undeveloped or latent image gray scale formed to extend along each arm thereof at a location adjacent the photosensitive recording strips 529 and 531 by photographic printing practices. For the purpose of simplifying the drawings, no attempt has been made to illustrate these gray scales, which are similar to the latent image gray scales of Fig. 1.

Inasmuch as the U-shaped reference member 539 is made entirely of photosensitive material, a guarantee portion will be provided by the base of the U, which portion of the member 539 will be completely unexposed.

Operation and processing of the dosimeter 50 is generally similar in all respects to the operation and processing of the dosimeter 10.

Figure 6:
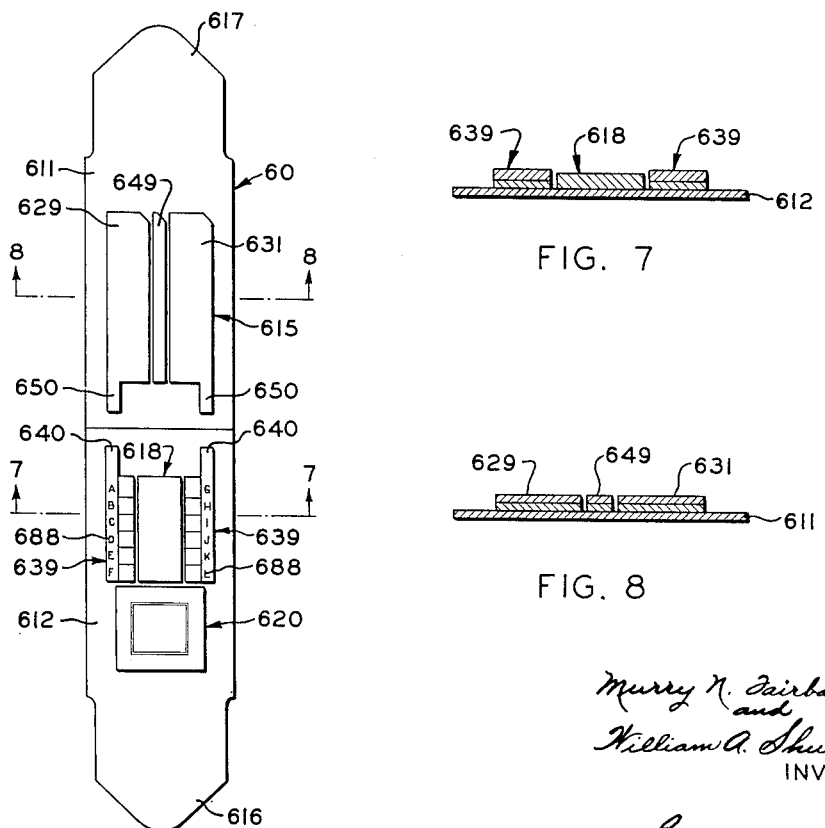
Fig. 6 is a plan view of a preferred embodiment of a dosimeter with the envelope wall portions thereof positioned in spread-apart condition as in Fig. 1.

A preferred embodiment of the invention is disclosed in Fig. 6, wherein there is illustrated a dosimeter which is generally indicated by the reference numeral 60 and which is generally similar to the dosimeters 10 and 50 in that it makes use of individual and sealed-together envelope-forming layers or wall-forming members 611 and 612 having leaders 616 and 617 and a container 620 which employ materials and constructions substantially identical with the corresponding wall members and containers of the dosimeters 10 and 50. The differences between the dosimeter 60 and the dosimeters 10 and 50 reside in the constructions employed for the photosensitive and print-carrying elements thereof.

Unlike the dosimeters 10 and 50, the dosimeter 60 employs a preformed gray scale which is mounted on the print-carrying element. By a preformed gray scale we mean a gray scale having the density steps thereof in a visible condition as distinguished from a condition where they are potentially visible and dependent upon processing of the dosimeter to render them visible, as in the case of a latent image gray scale such as that previously described. Preformed gray scale means are intended to be provided by mechanical printing practices or by appropriate photoexposure and development of a photosensitive material or by a combination of these practices. In fact, it has been found that a combination of photographic printing and development and mechanical printing is well adapted for forming the gray scale means employed with the dosimeter 60. Thus, the gray scale may be photographically printed on a portion of a strip of a silver halide emulsion and the strip then developed to provide the gray scale, after which the indicia associated with the gray scale steps are mechanically printed on an unexposed and fixed portion of the strip. The practice which makes use of a preformed gray scale is advantageous in that it avoids the possible occurrence of change in latent image which remains undeveloped for long periods of time.

With particular reference to Fig. 6, the print-carrying element 618 is formed of a rectangular sheet of image-receptive material, for example baryta paper, and is secured to the wall member 612 by heat-sealing. In this embodiment of the invention, the gray scale means are individual members 639 which are adapted to be mounted on the envelope wall 612 on opposite sides of the print-carrying element 618 and between the print-carrying element and the long edges of the dosimeter and to be secured thereto by heat-sealing. Each gray scale member 639 is provided adjacent one edge thereof with the usual longitudinally extending row of six density steps and also with a row of lettered indicia 668 located along the other long edge of the member. Each member 639 is positioned so that the gray scale thereof is located next to the print-carrying element 618.

Figure 7:
Fig. 7 is a sectional view on the line 7—7 of Fig. 6.
Figure 8:
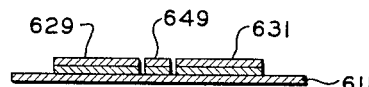
Fig. 8 is a sectional view on the line 8—8 of Fig. 6.

In Fig. 6, the gray scale and indicia formed on the member 639 are respectively provided by photographic and mechanical printing practices as heretofore described and, in this regard, the material used for the gray scale members 639 comprises an appropriately exposed, developed and fixed silver halide emulsion layer carried on a conventional film base. The members 639, in addition to providing gray scale means, are also intended to function as spacers by utilizing, as shown in Fig. 7, a material for the gray scale members which is thicker than the material providing the print-carrying element 618. If the emulsion layer and film base employed for forming the gray scale member 639 do not possess the desired thickness, one or more backing strips of suitable paper, for example kraft paper, may be adhered to the bottom or outer surface of the film base. In this regard, it is to be noted that each gray scale member 639 has an extension 640 thereon to provide elongated spacer means. These extensions 640 extend beyond the end of the print-carrying element 618 which is most distant from the container 620 and elongate that part of the members 639 which have the indicia 668 printed thereon.

The photosensitive element 615 of the unit 60 employs a plurality of rectangularly shaped photosensitve strips, each of which comprises a silver halide emulsion layer supported on a conventional film base. Three such photosensitive strips are disclosed, namely, two photosensitive recording strips 629 and 631 and a photosensitive strip 649 in the form of a guarantee strip. All photosensitive strips are unexposed prior to use. The recording strips 629 and 631 make use of photosensitive materials similar to those described in connection with the strips 29 and 31. Thus, the strip 629 will have the highest film speed to nuclear radiation of the photosensitive strips disclosed in conjunction with the element 615, while the recording strip 631 will have the next highest film speed. The so-called guarantee strip 649 is an emulsion comparable with that described in connection with the reference strips 39 of Fig. 2 and consequently is very insensitive to the radiation to be detected.

In the embodiment of the invention disclosed in Fig. 6, the recording strips are relatively wide and each recording strip is located adjacent a longitudinal edge or a long side of the photosensitive element. As may be noted, the photosensitive recording strips 629 and 631 are spaced apart whereby to permit the guarantee strip 649 to be located between them and centrally of the photosensitive element 615. Recording strips 629 and 631 are made relatively wide so as to provide a photosensitive element having a width which is substantially similar to the width of the print-carrying element and its associated gray scale 639. In fact, it may be said that preferably the photosensitive and print-carrying elements in all embodiments of the invention should possess similar widths.

The members which make up the photosensitive element 615 are each considerably longer than the print-carrying element 618. Consequently, the photosensitive strips 629, 631 and 649 may be heat-sealed to the inner surface of the wall member 611 at their ends which are located the nearest to the leader 617 without fear of fogging those portions of the photosensitive strips adapted to overlie and cooperate with the print-carrying element 618 whereby to facilitate assembly of the unit. Alternatively, the photosensitive strips which provide the photosensitive element 615 may be secured to the envelope wall member by means of an adhesive strip, such as the strip 44 of Fig. 1, or the photosensitive strips may be mounted upon a support layer, such as the layer 27 of Fig. 2, and this support layer may be either heat-sealed to the wall member or secured thereto by an adhesive strip. As may be noted, a corner of each strip 629, 631 and 649 is cut away. This expedient is employed to facilitate assembly, especially when carried out in a dark room, by assisting in correctly positioning the photosensitive strips.

It is also to be observed that the two photosensitive recording strips 629 and 631 are respectively provided with extension portions 650 which overlie and which are adapted to cooperate with the extensions 640 on the gray scale members 639 during processing to provide trap means for receiving and trapping excess processing liquid following the rupture of the container 620 and the spreading of its liquid content within the dosimeter envelope.

Use and processing of the dosimeter 60 is substantially similar to the use and processing of the dosimeters heretofore described. With the dosimeter 60, however, the transfer print formed by the guarantee strip 649 will appear centrally of the print-carrying element 618 and will extend from end to end thereof.

While the dosimeters illustrated in Figs. 1 through 8 have been shown as individual, unconnected units, it will be appreciated that a plurality of such dosimeters may be secured together in end-to-end relation to provide a fan-fold type of unit. For example, the end of the leaders of a sealed dosimeter may be suitably secured to the sealed end of another dosimeter, as by the use of an adhesive and heat-sealing or by the use of an adhesive strip, and so on, to provide a strip of connected-together dosimeter envelopes which may then be fanfolded. Alternatively, any of the dosimeters shown in Figs. 1 through 8 may be secured to a surface of a suitable backing or support sheet at appropriate intervals for fanfolding.

This last-mentioned arrangement is illustrated in Figs. 9 and 10 wherein the fanfold type of unit comprises a continuous backing sheet 100 on which individual and similar dosimeter envelopes 110 are mounted and secured by a strip 120 of a pressure- and/or heat-sensitive material at appropriate intervals to obtain the fanfold as shown in Fig. 10. In this regard, adjacent dosimeter envelopes are separated by spacing intervals at least equal to the length of an envelope. The backing or support sheet 100 is made sufficiently long to provide a leader portion 130 and a trailer portion 140 thereon.

The dosimeter envelopes 110 are diagrammatically shown and are intended to represent any of the dosimeters heretofore described in detail. Leader portions for the envelopes 110 may be omitted or are preferably made considerably shorter than the leaders 16 and 17 or 616 and 617. If desired, the backing sheet may be coated with an appropriate pressure- and/or heat-sensitive adhesive for securing the dosimeters 110 thereto and such practice may be used in conjunction with the adhesive strips 120 or may be employed as the sole means for securing the dosimeters to the backing sheet 100.

The dosimeters described herein are intended to be carried on the person and to be processed at the instant that the possessor of the device wishes to determine if he has been subjected to unsafe radiation conditions. Consequently, the dosimeters are relatively small. For example, the complete envelope in any of the embodiments heretofore disclosed may have dimensions of about three inches by one inch or even smaller.

Under the just noted-circumstances wherein the dosimeter is literally intended to be processed at an instant's notice, it is desirable to provide processing means of simple and light-weight construction for association with the dosimeter. Preferably, the processing device should be of a size and weight such that it may be carried on the person, as by attachment to an article of clothing or by suspension around the neck from a ribbon or cord, as in the case of the so-called military "dog tag," or even carried in a pocket. Also, the processing device should preferably be in the nature of a holder or carrier for storing or holding one or more dosimeters while protecting them from dirt, moisture and the application of forces which would rupture the liquid containers of the stored dosimeters. At the same time the processing device should be able to maintain the stored dosimeters in a generally flat condition ready for use and also should shield them from soft rays which might prematurely expose their photosensitive materials.

One embodiment of a processing unit, possessing the just-noted characteristics, is generally indicated by the reference character 70 in Figs. 11 and 12 and makes use of top and bottom cover members 71 and 72, respectively. Each cover member 71 and 72 comprises an elongated base in the form of a plate having bent-up portions which provide wall means. The upper cover member 71 is slightly wider than the lower cover member so that it may be engaged with the lower cover member to partially encase the latter. In the embodiment of the invention disclosed in Figs. 11 and 12, the cover members 71 and 72, when engaged with each other, are adapted to provide a boxlike structure in the nature of a container, as will become fully apparent.

In the case of the top cover member 71, side walls 73 and end wall members 75 and 77 are provided, while the bottom cover member 72 only has side wall members 74. As may be noted, the end wall member 75 is provided with an opening 79 therein and has its end most distant from the top plate bent over upon itself so that it is generally parallel to the top plate. The bottom cover member 72 has an elongated tongue 76 which extends from one end of the body of its base plate. Tongue 76 is adapted to be inserted within the opening 79 and is provided at its edges with ears 81 which are capable of being bent up so as to secure the cover members together. A suitable opening for engagement with a suspension cord or the like is shown as formed in the tongue 76.

It will be appreciated that the mounted cover means 71 and 72 will be connected together at one end by connecting means which permit them to be moved into and out of superposed and generally parallel relation with respect to each other. Fig. 11 shows the cover members in superposed relation and it is to be observed that the connection provided by the tongue 76, ears 81 and end wall 75 functions in the general nature of a pivot whereby the cover members may be spread apart in angular relation with respect to each other for loading the holder or removing a dosimeter therefrom. It is to be noted that the box-like structure provided by the superposed cover members 71 and 72 is open at the end thereof which is removed from the end having the pivotal connection for the cover members whereby to permit withdrawal of a dosimeter from the device when undergoing processing.

Means for securing the cover members in closed relation comprise a bail member 93 which is pivotally secured to the upper surface of the base plate of cover member 71 by means of a keeper or retainer plate 91 fixed to the cover member by conventional means such as the rivets which are shown. The outer surface of the cover member 71 may be provided with a depressed channel in which the base of the bail member is pivotally seated. For latching the bail, a projection 99 is formed near the edge on the outer surface of the base plate of the bottom cover 72. It will be apparent that the cover members will be retained in closed condition against forces tending to open or spread them apart when the bail is in the latched position shown in Fig. 12.

A spreader unit, capable of rupturing the container in the dosimeter and spreading the contents thereof within the container envelope, is included within the device 70. Essentially, this spreader comprises two spreader members which will be held in contact with each other when the cover members are closed and between which the dosimeter is moved to carry out a processing operation. In Fig. 12, one such spreader is indicated at 82 as comprising a round rod member which extends from side wall to side wall of the bottom cover 72 and is fixedly positioned transversely thereof at a location for contact with the other spreader member. The other spreader member is indicated at 85 and is an end portion of a flat spring 84 which has its opposite end fixed to the end of the base plate of cover member 71 adjacent the end wall 75 as by rivets. Spring 84 is so constructed that when mounted in the manner described and shown, it is constantly urged away from the top cover member 71 and when the cover members are in closed condition will be urged towards the spreader member 82. The spreader member 85 of the spring 84 is a bent portion thereof which is suitably rounded and is located for contact with the spreader member 82. As may be observed, spring 84, at least over the part thereof forming the spreader 85, has a width substantially equal to the interior width of the processing holder 70. These spreader members 82 and 85 are substantially parallel to each other and effectively close the end of the processing holder when the cover members are in superposed parallel relation whereby to assist in retaining a dosimeter within the device.

In the use of the processing device 70, a dosimeter envelope should always be located between the spring 84 and the inner surface of the lower cover member 72. Means are provided in the processing device to prevent improper loading of a dosimeter. These means make use of the retainer plate 91 and shape this plate to extend around the end wall 77 of the cover plate 71 to provide a projecting lip portion 97 which protrudes into the interior of the processing device. The lip portion 97 is sufficiently long to engage an extension 94 formed on the free end of the spring spreader member 85 whereby the movement of the free end of the spring 84 is restrained. Regardless of the width of the restraining lip 97, it will be appreciated that this construction makes it substantially impossible to insert a dosimeter between the spring 84 and the inner surface of the upper cover member 71. However, movement of the spring 84 is always sufficient to bring the spreader member 85 thereof into proper processing contact with the spreader member 82.

For storage purposes, a dosimeter is adapted to have the leader or tab portions thereof folded over one outer face of the dosimeter envelope, as shown in Fig. 4. The processing holder 70, as in the case of all processing devices disclosed herein, has a length sufficient to carry a dosimeter folded for storage so that the dosimeter is positioned between the connected ends of the holder and the spreader members 82 and 85 and is free of engagement with the spreader members. This is advantageous since it protects the leader portions of the stored dosimeter from damage. Preferably, the interior of the processing device is large enough to carry two or more dosimeters in the storage condition just described, with one dosimeter superposed upon another.

It is desirable to provide the processing device with shield means to counteract the excessive effect of soft rays, as for example X-rays of long wavelength which have a low penetrating power, on the photosensitive portions of a dosimeter stored within the holder. These shield means comprise a liner of a material tending to attenuate such radiation by an appropriate factor and may comprise lead or cadmium or other heavy metal or alloy.

In Figs. 11 and 12 shield members 87 and 88 are shown as carried, respectively, by the inner surfaces of the base plates of the top cover member 71 and the bottom cover member 72. Shield members 87 and 88 may be fixed to the cover members by any suitable means, such as by rivets or by the use of suitable cements and/or adhesives. It is also possible to mount either or both of the shields 87 and 88 upon the exterior of the cover members. It is to be noted that the spring member 84 is U-shaped and that shield member 87 is located between the arms of the spring as a construction expedient to conserve space.

It is to be noted that the shields 87 and 88 are of a generally rectangular shape and have their longitudinal axes centered on the longitudinal axis of the container. The shield members are of a width sufficient to cover the photosensitive emulsions of the photosensitive element of a dosimeter mounted within the holder and are so positioned that these photosensitive portions will be fully covered when a dosimeter is placed in the holder device for storage. Shields 87 and 88 provide predetermined attenuation of soft rays incident thereon whereby to counteract their effect upon the photosensitive materials within the dosimeter envelope. In cases where soft rays are encountered which are at other than normal incidence, as for example rays which make a large angle with the shield members 87 and 88, it may be desirable to provide additional shield members along the side walls of the processing device.

Operation of the processing device 70 will be apparent from the foregoing. The manner in which one or more dosimeters may be loaded into the device for storage has already been described. Assuming that a dosimeter is stored within the device and it is desired to process the dosimeter, the bail member 93 is moved to its unlatching position and the cover members 71 and 72 are spread apart about their connected ends as a pivot whereby to permit the stored dosimeter to be removed therefrom. The folded leader portions of the dosimeter are then straightened so that they are aligned with the body portion of the envelope and the dosimeter is inserted between the open cover members in this condition and with the leader portions thereof located between the spreader members 82 and 85. Following this, the cover members are moved into their closed or superposed position and are secured by the bail member 93. The processing device 70 is then held in one hand and the protruding leader portions are grasped with the fingers of the other hand and are pulled, whereby the dosimeter is pulled between the spring-loaded spreader members 82 and 85 and entirely out of the processing unit 70.

It is to be noted that the spreader members 82 and 85 are in spring-loaded contact with each other when the cover members of the processing device 70 are in closed position and no dosimeter is engaged between the spreader members. On the other hand, the spreader members will be separated to some extent when the cover members of the processing device are closed and when a dosimeter is engaged between the spreader members. The spreader members 82 and 85, in effect, provide means for applying pressure to the opposite sides of a dosimeter which is engaged between the spreader members and which is pulled between them whereby to effect the rupture of the container and the spreading of its liquid content.

Spring 84 is designed to create a pressure or force which is sufficient to rupture the container of a dosimeter undergoing processing and which is great enough to spread the liquid content of the container in a thin layer within the envelope of the dosimeter. Consequently, during the spreading operation itself, the separation between the spreader members 82 and 85 will remain substantially equal to the thickness of the body portion of the dosimeter, i. e., the thickness of the wall members of the envelope plus the thickness of the print-carrying element and the thickness of the photosensitive element, including spacer means within the dosimeter element.

Processing device 70, as well as all of the embodiments thereof described herein, may be formed of any suitable material such as metal or organic plastics. Even wood may be used as a construction material. Whatever material is employed, a material having a light unit weight is highly desirable. Of the metals, aluminum is a preferred material. Other light-weight metals and alloys may of course be used.

A processing apparatus, similar to apparatus 70 of Figs. 11 and 12, may also be used for holding and processing the fanfold unit of Figs. 9 and 10. In this connection, the processing apparatus will be made sufficiently deep to receive the plurality of dosimeters of the fanfold unit and will suitably locate the spreader members of the apparatus so that their spreading surfaces will be appropriately aligned for receiving the leader end of the fanfold pack. Processing of the fanfold pack will be apparent from the foregoing. After loading a fanfold pack into a processing apparatus, the leader portion 130 of the pack will extend from the apparatus and the first dosimeter of the pack may be processed by exerting a pulling force on the leader to draw the first dosimeter envelope through the spreader members.

In processing the first dosimeter, the fanfold pack is withdrawn from the apparatus so that at least a portion of the pack which forms the spacing interval between the first and second dosimeters will extend beyond the apparatus and so that the second dosimeter of the pack is moved into ready position for processing by the spreader members of the apparatus. The processed dosimeter is disconnected from the unit by cutting or tearing the portion of the fanfold pack which forms the spacing interval between the first and second dosimeters at a position adjacent the trailing end of the processed dosimeter. Processing of the second and remaining dosimeters of the fanfold pack is carried out in a manner similar to that just described.

While the invention has been described in connection with specific photosensitive materials which provide an effective range for the dosimeter of from about 5 to 500 roentgens, it will be appreciated that other photosensitive materials possessing different ranges of sensitivity may be substituted for those shown by way of illustration. Such a variation is deemed within the scope of the invention.

From the foregoing it will be appreciated that the aims and objects of this invention have been accomplished in the provision of a variety of dosimeter embodiments, all of which are capable of detecting, indicating, recording and measuring radiation dosages and which may be quickly processed on an instant's notice.

Since certain changes may be made in the above products without departing from the scope of the invention herein involved, it is intended that all matter contained in the above description or shown in the accompanying drawings shall be interpreted as illustrative and not in a limiting sense.

What is claimed is:

1. In a unit which contains photosensitive material for detecting and indicating the presence of nuclear radiation, in combination, an envelope having a pair of wall members which are each substantially impervious to processing liquid employed with the unit and which are arranged in superposed relation with respect to each other, said wall members also being further characterized by the fact that they are each substantially opaque to radiation of a wavelength within the visible spectrum and that they transmit shorter wavelength radiation including X-rays and gamma rays, a photosensitive element and a print-carrying element positioned within said envelope in superposed relation to each other, a rupturable container holding a liquid processing composition carried within said envelope and in a position so as to be capable of being ruptured and, upon rupture, of releasing its liquid content between said superposed photosensitive and print-carrying elements, said photosensitive element having at least one recording strip of photosensitive material comprising a heavy metal salt which, upon photoexposure to nuclear radiation to be detected, as well as to visible radiation, is capable of having formed therein latent image which is developable to the metal of said salt, said print-carrying element comprising a sheet material for supporting print-forming components transferred from said photosensitive element upon development and processing of latent image, said rupturable container holding as a processing liquid at least a thickening agent and a solvent for photographic processing material, said envelope having positioned therein photographic processing material including at least a developer for said heavy metal salt, said material being rendered effective upon release of said liquid and being in sufficient quantity to process latent image in said photosensitive element and to provide a positive print by transfer on said image-carrying element, and a reference strip carried within said envelope and having means capable of providing a scale of gray tones extending in steps of increasing optical density from adjacent one end of said reference strip towards the other end of said reference strip and against which the optical density of the transfer print can be compared, said reference strip and said means thereof which are capable of providing a scale of gray tones being characterized by remaining substantially unaffected in the presence of radiation to be detected and indicated.

2. In a photosensitive unit as defined in claim 1, a reference strip which comprises a preexposed photosensitive strip having said photosensitive heavy metal salt as the photosensitive material thereof, said preexposed reference strip containing latent image which is formed by the photoexposure of said reference strip through a scale of gray tones provided by steps of increasing optical density, said preexposed reference strip comprising a part of said photosensitive element and all said strips of photosensitive character, including said reference strip and said recording strip, being arranged in side-by-side relation.

3. A photosensitive unit as defined in claim 1, wherein said reference strip is provided with a preformed scale of gray tones extending in steps of increasing optical density from adjacent one end of said reference strip towards the other end of said reference strip and wherein said reference strip and said print-carrying element are arranged in side-by-side relation.

4. A photosensitive unit as defined in claim 1, wherein said photosensitive element comprises at least two recording strips of said photosensitive material and wherein each recording strip has a different film speed.

5. In a photosensitive unit as defined in claim 1, means capable of providing an indication of the failure of said unit for carrying out its detecting function and comprising an unexposed photosensitive portion which is associated with said photosensitive element and which is formed of a photosensitive heavy metal salt possessing a film speed which is extremely slow to the nuclear radiation to be measured.

6. In a unit which contains photosensitive material for detecting and indicating the presence of nuclear radiation, in combination, an envelope having a pair of wall members which are each substantially impervious to processing liquid employed with the unit and which are arranged in superposed relation with respect to each other, said wall members being further characterized by the fact that they are each substantially opaque to radiation of a wavelength within the visible spectrum and that they transmit shorter wavelength radiation including X-rays and gamma rays, a photosensitive element and a print-carrying element positioned within said envelope in superposed relation to each other, and a rupturable container holding a liquid processing composition carried within said envelope and in a position so as to be capable of being ruptured and, upon rupture, of releasing its liquid content between said superposed photosensitive and print-carrying elements, said photosensitive element comprising at least two photosensitive strips of silver halide arranged in side-by-side relation, one of said strips providing a photosensitive recording strip capable of having latent image formed therein upon exposure thereof to nuclear radiation to be detected, said other strip providing a preexposed photosensitive reference strip which has been photographically printed substantially from end to end thereof through a scale of gray tones arranged in steps of increasing optical density whereby said reference strip contains latent image, said print-carrying element comprising a sheet material for supporting print-forming components transferred from said photosensitive element upon development and processing of latent image in said recording and reference strips, said rupturable container holding as a processing liquid at least a thickening agent and a solvent for photographic processing material, said envelope having positioned therein photographic processing material including a silver halide developer and a silver halide fixer, both rendered effective upon release of said liquid and in sufficient quantity to process latent image in said photosensitive element and to provide on said image-carrying element by transfer a reverse print of latent image developed in said reference strip and in said recording strip.

7. A photosensitive unit as defined in claim 6 and having a plurality of photosensitive recording strips each of which has a different film speed.

8. A photosensitive unit as defined in claim 6 and having a plurality of photosensitive recording strips and a plurality of photosensitive reference strips, an individual reference strip being associated with each recording strip, each recording strip having a film speed which is different from that of any of the other photosensitive strips and which is faster than the film speed of any reference strip, all of said reference strips having substantially the same film speed.

9. A photosensitive unit as defined in claim 6, wherein said unit includes means which are capable of providing an indication of the failure of said unit for carrying out its detecting function and which comprise an unexposed silver halide portion of said photosensitive element, said unexposed portion providing said indicating means having a considerably slower film speed with regard to the nuclear radiation to be detected than that of the photosensitive silver halide of said recording strip.

10. In a photosensitive unit for detecting and indicating the presence of nuclear radiation, in combination, an envelope having a pair of wall members which are each substantially impervious to processing liquid employed with the unit and which are arranged in superposed relation with respect to each other, said wall members being further characterized by the fact that they are each substantially opaque to radiation of a wavelength within the visible spectrum and that they transmit shorter wavelength radiation including X-rays and gamma rays, a photosensitive element and a print-carrying element positioned within said envelope in superposed relation to each other, and a rupturable container holding a liquid processing composition carried within said envelope and in a position so as to be capable of being ruptured and, upon rupture, of releasing its liquid content between said superposed photosensitive and print-carrying elements, said photosensitive element comprising at least one photosensitive strip of silver halide adapted to provide a photosensitive recording strip capable of having latent image formed therein upon exposure thereof to nuclear radiation to be detected, said print-carrying element comprising a sheet material for supporting print-forming components which are developable to silver and which are adapted to be transferred from said photosensitive element upon processing of latent image in said recording strip, a reference strip carried within said envelope in side-by-side relation to said print-carrying element, said reference strip being provided with a preformed scale of gray tones which extend in steps of increasing optical density from adjacent one end of said reference strip towards the other end of said reference strip and against which there can be compared the optical density of a transfer print of said recording strip and said reference strip and the preformed gray scale thereof being characterized by remaining substantially unaffected in the presence of radiation to be detected and indicated, said rupturable container holding as a processing liquid at least a thickening agent and a solvent for photographic processing material, said envelope having positioned therein photographic processing material, including a silver halide developer and a silver halide fixer, both rendered effective upon release of said liquid and in sufficient quantity to process latent image in said photosensitive element and to provide on said image-carrying element by transfer a reverse print of latent image developed in said recording strip.

11. A photosensitive unit as defined in claim 10 and having a plurality of photosensitive recording strips and an individual reference strip associated with each recording strip.

12. A photosensitive unit as defined in claim 10, wherein said unit includes means which are capable of providing an indication of the failure of said unit for carrying out its detecting function and which comprise an unexposed silver halide portion of said photosensitive element, said unexposed silver halide portion having a considerably slower film speed with regard to the nuclear radiation to be detected than that of the photosensitive silver halide of said recording strip.

References Cited in the file of this patent
UNITED STATES PATENTS

| | | |
|---|---|---|
| 2,258,593 | Black | Oct. 14, 1941 |
| 2,483,991 | Wollan et al. | Oct. 4, 1949 |
| 2,496,218 | Kieffer | Jan. 31, 1950 |
| 2,500,422 | Land | Mar. 14, 1950 |
| 2,565,378 | Land | Aug. 21, 1951 |
| 2,624,011 | Stern | Dec. 30, 1952 |
| 2,659,825 | Land | Nov. 17, 1953 |